(12) United States Patent
Jothiswaran (10) Patent No.: US 9,646,630 B2
(45) Date of Patent: May 9, 2017

(54) VOICE RECOGNITION VIA WIDE RANGE ADAPTIVE BEAM FORMING AND MULTI-CHANNEL AUDIO DATA

(71) Applicant: INTEL CORPORATION, Santa Clara, CA (US)

(72) Inventor: Gangatharan Jothiswaran, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 14/015,309

(22) Filed: Aug. 30, 2013

(65) Prior Publication Data

US 2015/0066508 A1 Mar. 5, 2015

(51) Int. Cl.
*G10L 21/0272* (2013.01)
*G10L 15/08* (2006.01)
*G10L 15/32* (2013.01)
*G10L 21/0216* (2013.01)

(52) U.S. Cl.
CPC .......... *G10L 21/0272* (2013.01); *G10L 15/32* (2013.01); *G10L 2015/088* (2013.01); *G10L 2021/02166* (2013.01)

(58) Field of Classification Search
CPC ................................. G10L 21/0272
USPC ........................................... 704/246
See application file for complete search history.

(56) References Cited

U.S. PATENT DOCUMENTS

| | | | |
|---|---|---|---|
| 6,529,608 B2 * | 3/2003 | Gersabeck et al. | 381/110 |
| 7,072,833 B2 * | 7/2006 | Rajan | 704/233 |
| 7,627,139 B2 * | 12/2009 | Marks | A63F 13/00 345/156 |

* cited by examiner

*Primary Examiner* — Susan McFadden
(74) *Attorney, Agent, or Firm* — International IP Law Group, P.L.L.C.

(57) ABSTRACT

An apparatus, system, and computer readable media for data pre-processing and processing for voice recognition are described herein. The apparatus includes logic to pre-process multi-channel audio data and logic to resolve a source location. The apparatus also includes logic to perform wide range adaptive beam forming, and logic to perform full voice recognition.

20 Claims, 7 Drawing Sheets

VOICE RECOGNITION VIA WIDE RANGE ADAPTIVE BEAM FORMING AND MULTI-CHANNEL AUDIO DATA

TECHNICAL FIELD

The present techniques relate generally to an apparatus and system of audio preprocessing: More specifically, the present techniques enable microphone audio preprocessing for voice recognition.

BACKGROUND ART

A computing device implements voice recognition by assuming the computing device is in a particular position when a voice signal is sent to the device for recognition. Beam forming may then be used to receive the voice signal from a location expected by the computing device. By assuming a position of the device, voice signals originating from outside of the location expected by the computing device may not be received by the computing device for voice recognition. Furthermore, if the computing device is in a position other that the position assumed for voice recognition, then voice recognition may not be possible.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Voice recognition techniques typically include beam forming which assumes the user is located within a special envelope and that the computing device is in a particular position, such as an up-right position. The up-right position occurs when the device in a typical operating position, such as when a tablet is held by a user in a portrait or landscape orientation. Beam forming may be used in the up-right position by disposing two microphones within the computing device, then detecting a voice signal originating from a user within the special envelope. Typically, the user is equidistant from each microphone when the user is located within the special envelope. In this manner, the voice signal received at each microphone may be in phase, and the signal-to-noise ratio (SNR) of the received voice signal may be improved by filtering out the noise based on the two received voice signals.

Since beam forming operates by knowing the location of the microphones and positioning the user within a special envelope, beam forming may not be used when the computing device is in a lay-flat position. A lay-flat position is a position of the computing device where the computing device oriented such that it is lying flat. For example, when the operating device is a tablet, the lay-flat position may occur when the tablet is laying flat on a physical surface, such as a table. However, the computing device does not require a physical surface to be in a lay-flat position. Embodiments described herein enable data pre-processing and processing for voice recognition. In embodiments, data such as voice signals may be obtained when the computing device is in any position, such as a lay-flat position or up-right position through wide range adaptive beam forming. The resulting omni-directionality in obtaining voice signals enables voice recognition that is functional with the user located in a wider range of distances and directions with respect to the computing device.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
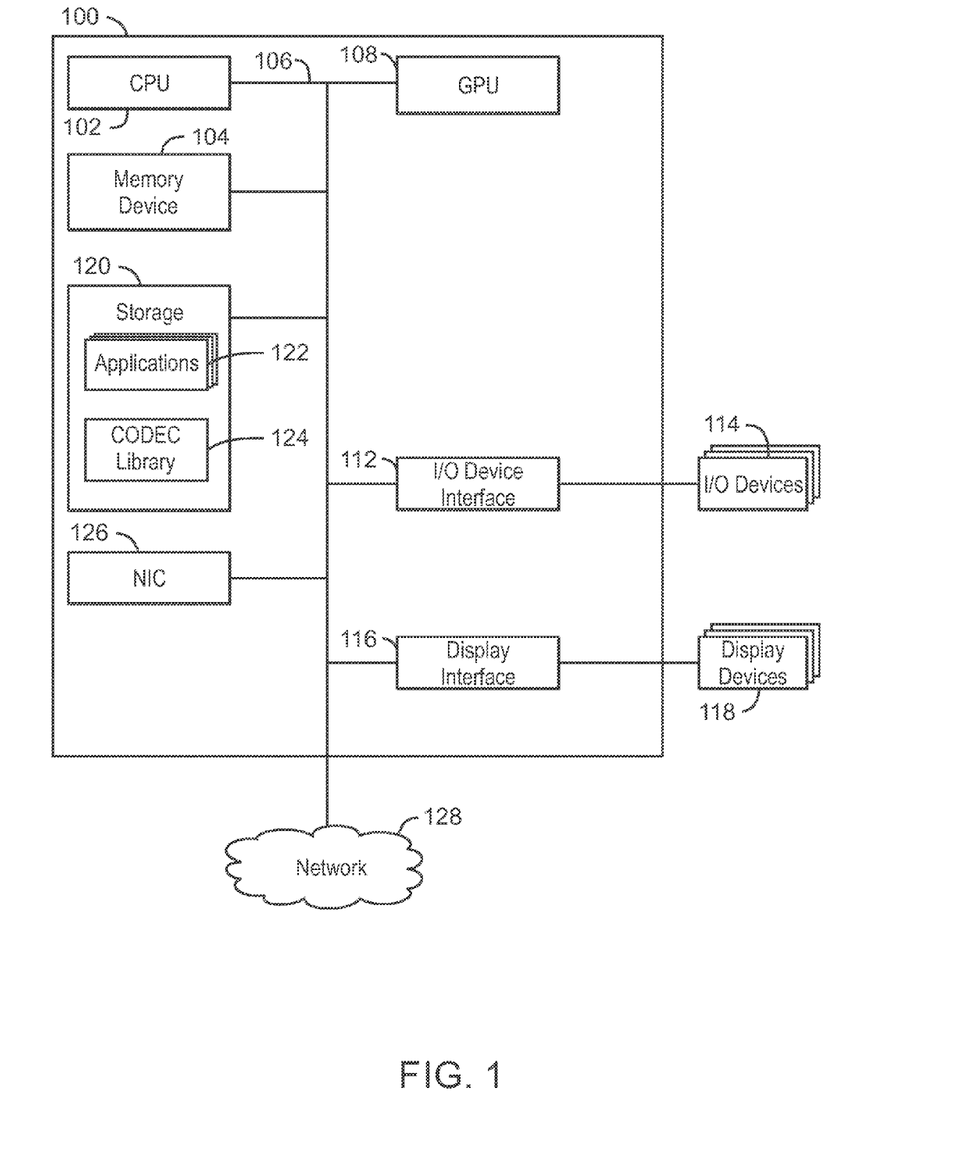
FIG. 1 is a block diagram of a computing device that may be used to process data for voice recognition.

FIG. 1 is a block diagram of a computing device 100 that may be used to process data for voice recognition. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100.

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100. In some examples, an I/O device 114 may be a microphone. The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is externally connected to the computing device 100.

The computing device also includes a storage device 120. The storage device 120 is a physical memory such as a hard drive, an optical drive, a thumbdrive, an array of drives, or any combinations thereof. The storage device 120 may also include remote storage drives. A number of applications 122 may be stored on the storage device 120. The applications 122 may include a voice recognition application. Additionally, a codec library 124 may be stored on the storage device 120. The codec library 124 may include various codecs for the processing of audio data. A codec may be a software or hardware component of a computing device that can encode or decode a stream of data. In some cases, a codec may be a software or hardware component of a computing device that can be used to compress or decompress a stream of data. In embodiments, the codec library includes an audio codec that can process multi-channel audio data. Pre-processing the multi-channel audio data may implement voice recognition in various modes, including lay-flat and up-right. The lay-flat mode is when the computing device is in a lay-flat position, while up-right mode occurs when the computing device is in an up-right position.

In any mode, the multi-channel audio data can be separated using blind source separation. Voice recognition may be performed when one or more channels are selected from the multi-channel audio data after blind source separation has been performed. This initial voice recognition may be used with a small database of recognized words. Adaptive beam forming may be applied to the selected one or more channels, and full voice recognition may be performed on the selected one or more channels.

The computing device 100 may also include a network interface controller (NIC) 126 may be configured to connect the computing device 100 through the bus 106 to a network 128. The network 128 may be a wide area network (WAN), local area network (LAN), or the Internet, among others.

The block diagram of FIG. 1 is not intended to indicate that the computing device 100 is to include all of the components shown in FIG. 1. Rather, the computing system 100 can include fewer or additional components not illustrated in FIG. 1 (e.g., sensors, power management integrated circuits, additional network interfaces, etc.). The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
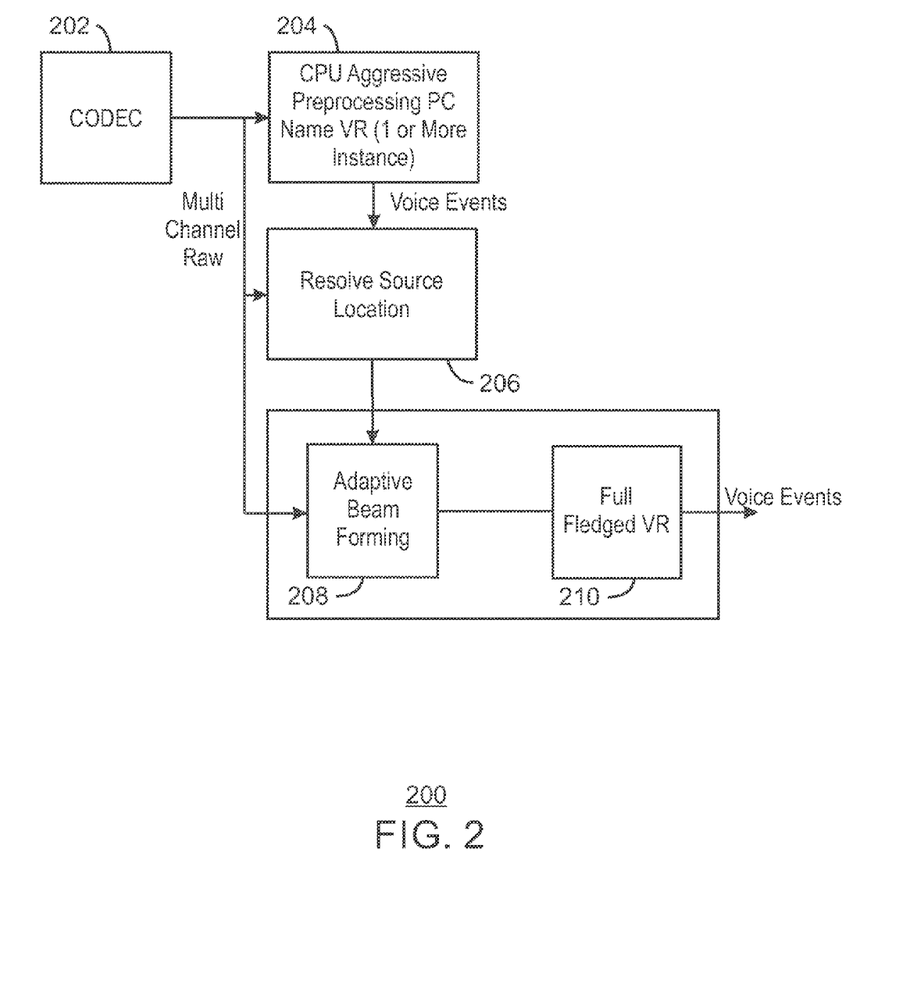
FIG. 2 is a block diagram of a system of data pre-processing and processing for voice recognition.

FIG. 2 is a block diagram of a system 200 of data pre-processing and processing for voice recognition. The signal-to-noise ratio (SNR) of a selected channel in the multi-channel audio data may be improved after reception of the audio signal from the microphone. The system in FIG. 2 can improve the SNR of the signal on the selected channel for voice recognition, which can in turn improve the accuracy of voice recognition at reduced computation cost.

At block 202, a codec is used to process the multi-channel audio data. The multi-channel audio data may be obtained from one or more input devices, such as a number of microphones. In some embodiments, the codec is a codec library that decompresses that multi-channel audio data into multi-channel audio data in a RAW format. At block 204, voice events may be detected using aggressive pre-processing. The voice events that occur at block 204 may be recognized by a smaller voice recognition database when compared to a full-fledged voice recognition. In some examples, the pre-processing at block 204 is triggered by a change in the location of a previously selected channel where full-fledged voice recognition was performed.

At block 206 the source location is resolved. In particular, the location of where the data channel that included the recognized single word is located is resolved. To resolve the location each channel may be compared at the time where the single word was recognized. At block 208, adaptive beam forming is performed on the RAW multi-channel audio using the resolved location found at block 206. In embodiments, the beam forming may adapt to the particular location of the selected channel that is resolved at block 206. At block 210, full voice recognition is performed on the beam formed audio output. Voice events from the selected channel may be obtained and used to control various functionality of the computing device. Accordingly, an algorithm such as blind source separation can be used in combination with beam forming to reduce the computational costs associated with traditional voice recognition techniques.

Figure 3:
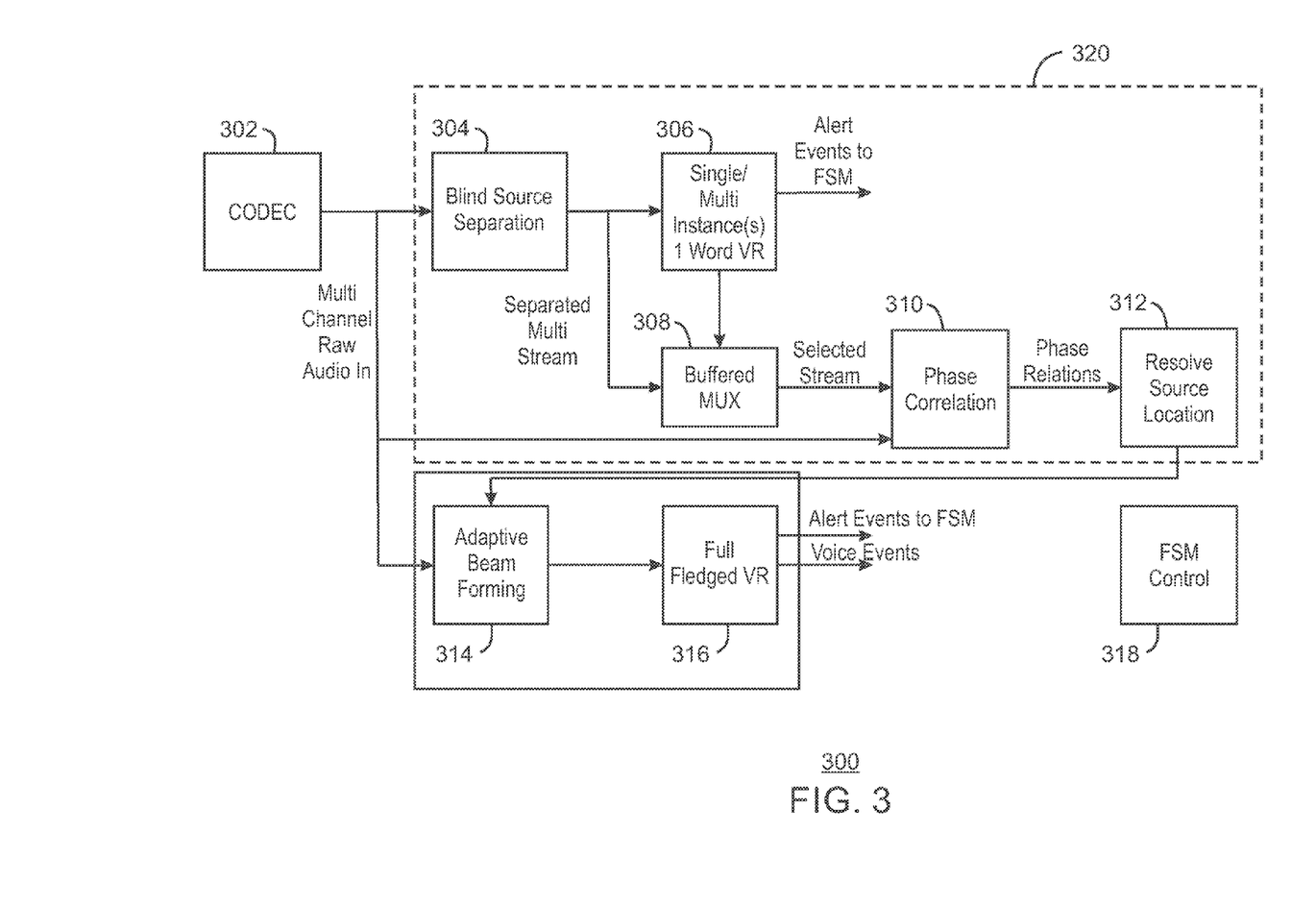
FIG. 3 is a block diagram showing the preprocessing architecture proposed for a robust wide range adaptive beam forming.

FIG. 3 is a block diagram of a system 300 illustrating the preprocessing architecture for robust wide range adaptive beam forming. At block 302, a codec is used to decompress the multi-channel audio data. There may be any number of channels of audio data. The multi-channel audio data may be obtained from one or more input devices. At block 304, blind source separation is used to separate the multi-channel audio data into several signals with spatial relationships. In some examples, blind source separation is an algorithm which separates a source signal with a spatial relationship to individual streams of audio data. Blind source separation may have as input a multi-channel audio source and provides multi-channel output, where the channels are separated based on their spatial relationships.

In embodiments, the blind source separation may improve the SNR of each signal that is separated from the multi-channel audio data. In this manner, the separated multi-channel audio data may be immune to any sort of echo. An echo in audio data may be considered noise, and the result of the blind source separation algorithm is a signal that has a small amount of noise, resulting in a high SNR. Blind source separation may be executed in a power aware manner. In some embodiments, blind source separation may be triggered by a change in the multi channel RAW audio data that is greater than some threshold. For example, the blind source separation algorithm may run in a low power state until the spatial relationships previously defined by the blind source separation algorithm now longer apply in the computational blocks discussed below.

At block 306, light weight voice recognition is performed on the separated multi-channel audio data. In some examples, the light weight voice recognition may be used to recognize a single word or a small database of words on any channel of the separated multi-channel audio data. The recognized word or words may be referred to as a control word. The light-weight voice recognition may output the nth channel where the single word or a word from the small database of words was detected. In this manner, the light-weight voice recognition may be used to determine an nth channel from the separated multi-channel audio data. The light-weight voice recognition may also output alerts recognized on any channel to a finite state machine 318 discussed below. In some examples, the word used to determine the nth channel where the word is recognized is a user configured word.

At block 308, a buffered multiplexer selects the nth data stream where the control word was recognized from the separated multi-channel audio data. Accordingly, the buffered multiplexer takes as input an indicator of the nth data stream from the light-weight voice recognition as well as the separated multi-channel audio data from the blind source separation. In some examples, the buffered multiplexer is a circular buffer where the separated multi-channel audio data are accessed after the single word voice recognition completes. The data stream from the nth channel where the control word is recognized is passed to a phase correlator.

At block 310, phase correlation is performed. Phase correlation may be an algorithm that correlates data stream from the nth channel with multi-channel raw audio data from the codec at block 302. Phase correlation between the data stream from the nth channel and the multi-channel raw audio data determines the point at which the control word was mentioned throughout the multi-channel raw audio data.

In some cases, triangulation may be used to determine at what point in time the control word was mentioned across the multi-channel raw audio data. Echo cancellation may be performed on the multi-channel raw audio data before phase correlation is applied. The phase relations determined across the multi-channel raw audio data at the point when the control word is recognized may be used to resolve the source location.

At block 312, the source location is resolved using the phase relations determined through phase correlation. The source location is the location of the data from the nth channel that has been previously selected. In embodiments, the location of the selected signal data is resolved with the phase correlation data and details of the microphone placements within the system. This location detail may be used in wide range adaptive beam forming. At block 314, wide range adaptive beam forming is performed. If the voice signals received from the microphone are out of phase, they begin canceling out each other. If the signals are in phase, they will be amplified when summed. Beam forming will enhance the signals that are in phase and attenuate the signals that are not in phase. In particular, the adaptive beam forming may apply beam forming to the signals of interest, regardless of their location with respect to microphones of the computing device. Based on the location details calculated when the source location is resolved, the beam forming may be modified such that the user does not need to be equidistant from each microphone. In some examples, weights may be applied to selected channels from the multi-channel RAW data based on the source location data.

Additionally, in some examples, the source location is resolved and the angle of the nth channel with respect to microphones of the device is sent to the adaptive beam forming algorithm. Based on this angle, the beam forming algorithm may be modified such that it does not expect the user to be equidistant from each microphone. Rather, the adaptive beam forming algorithm adapts the point that the voice signal originates (at the nth channel) to the determined angle found when the source location is resolved. Further, the source location may be identified by a coordinate of the location. The location coordinate may be used to resolve the location of the nth channel with respect to the microphones of the computing device.

In embodiments, echo cancellation may be applied to the multi-channel raw audio data before it is used for adaptive beam forming. Further, when a user moves relative to the device, such that the determined angle of the nth channel with respect to microphones of the device no longer results in a data signal suitable for adaptive beam forming, blind source separation, light-weight voice recognition, and phase correlation may be used to determine a new source location. Accordingly, in some embodiments, the blocks at reference number 320 may operate in a low power or inactive state until the location of the nth channel changes such that wide range adaptive beam forming cannot be performed. Further, the blind source separation may be operable in an "always listening" mode, but blind source separation may not be active until there is some change in the source signal.

At block 316, full-fledged voice recognition is performed. The full-fledged voice recognition is voice recognition capable recognizing complete grammar on the beam formed audio output. The full-fledged voice recognition may be performed in any position or any mode, such as lay-flat mode and up-right mode. The full-fledged voice recognition may output alert events and voice events. In some cases, alert events are those events that maintain data within the computing device, and also maintain state machine inputs.

Voice events may be those events that are used by voice recognition software to perform some functionality. Furthermore, in some cases, an event may include an interrupt.

At block 318, a finite state machine (FSM) control may control the computing device using alert events from the full-fledged voice recognition. In examples, the finite state machine may be used to change a power state or operating state of the computing device.

Figure 4:
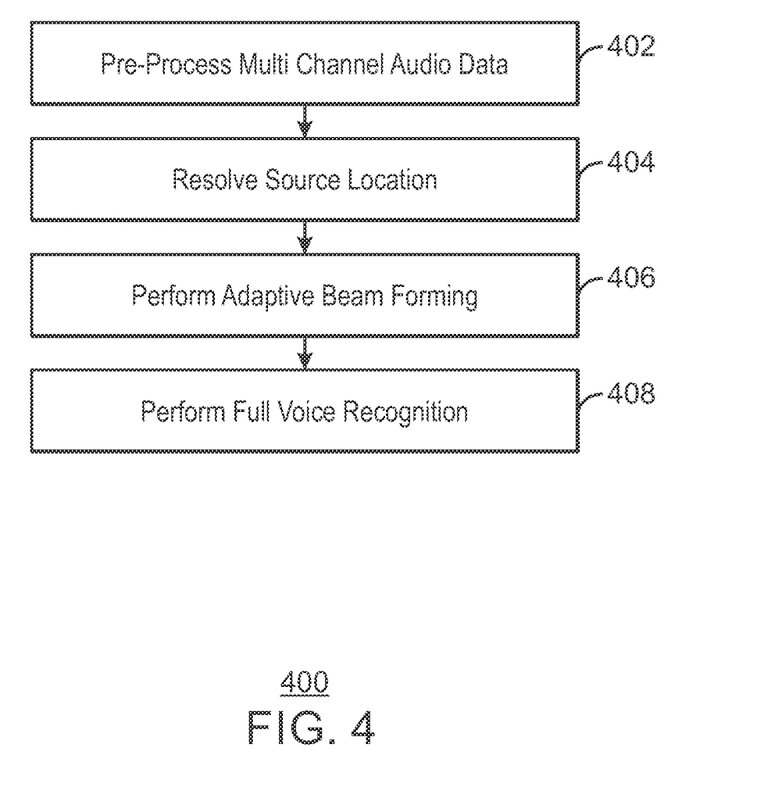
FIG. 4 is process flow diagram of data pre-processing and processing for voice recognition.

FIG. 4 is process flow diagram of data pre-processing and processing for voice recognition. At block 402, pre-processing is performed on multi-channel raw data. Pre-processing can include separating the multi-channel audio data using blind source separation, then performing light-weight voice recognition on one or more channels selected from the multi-channel audio data after blind source separation has been performed. This initial voice recognition may be used with a small database of recognized words. At block 404, the source location is resolved using the pre-processed data. The source location may be resolved by performing phase correlation on the selected channel from the multi-channel audio data. At block 406, adaptive beam forming is performed. The adaptive beam forming algorithm may adapt the point that the voice signal originates at the selected channel to the determined angle found when the source location is resolved. At block 408, full voice recognition is performed.

Figure 5:
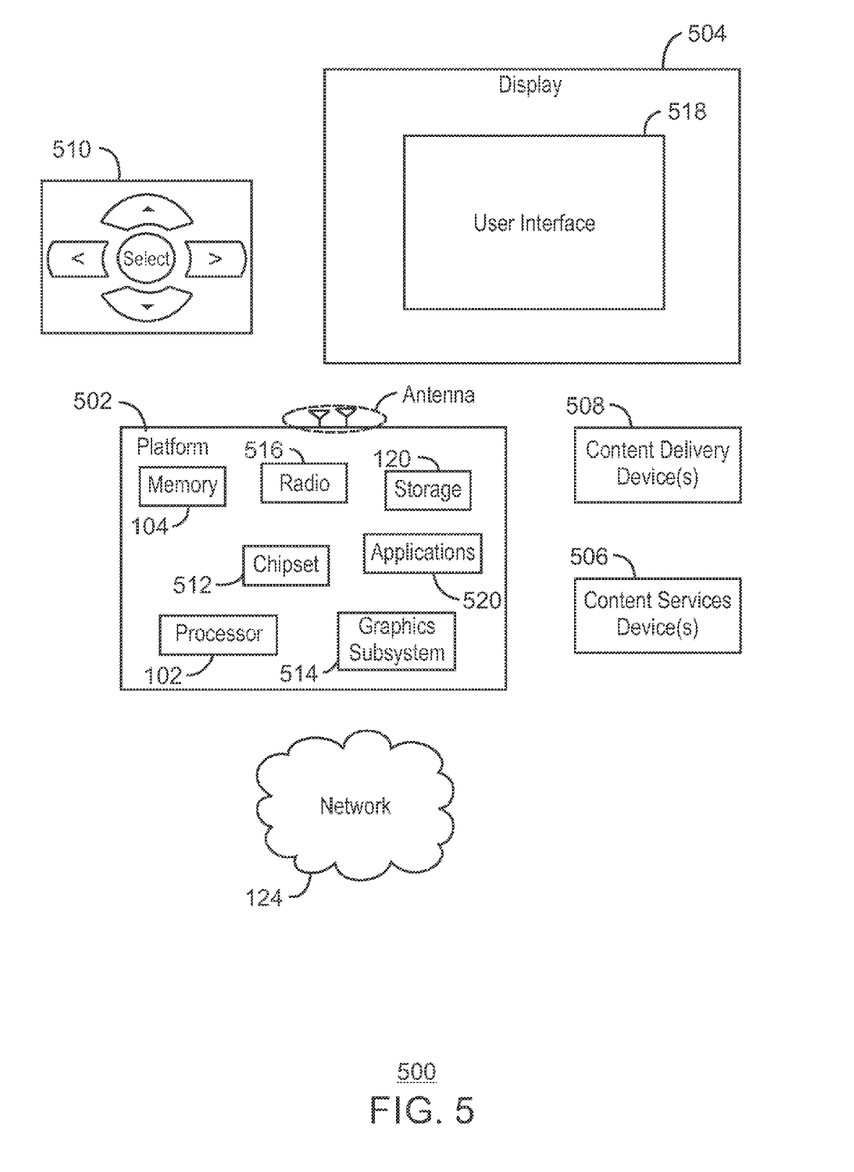
FIG. 5 is a block diagram of an exemplary system for data pre-processing and processing for voice recognition.

FIG. 5 is a block diagram of an exemplary system 500 for data pre-processing and processing for voice recognition. Like numbered items are as described with respect to FIG. 1. In some embodiments, the system 500 is a media system. In addition, the system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 500 comprises a platform 502 coupled to a display 504. The platform 502 may receive content from a content device, such as content services device(s) 506 or content delivery device(s) 508, or other similar content sources. A navigation controller 510 including one or more navigation features may be used to interact with, for example, the platform 502 and/or the display 504. Each of these components is described in more detail below.

The platform 502 may include any combination of a chipset 512, an SIMD processing unit 102, a memory device 104, a storage device 126, a graphics subsystem 514, software 128, and a radio 516. The chipset 512 may provide intercommunication among the SIMD processing unit 102, the memory device 104, the storage device 126, the graphics subsystem 514, the software 128, and the radio 514. For example, the chipset 512 may include a storage adapter (not shown) capable of providing intercommunication with the storage device 126.

The SIMD processing unit 102 may be a standalone unit, or the SIMD processing unit 102 may be implemented as a component of a Complex Instruction Set Computer (CISC) or Reduced Instruction Set Computer (RISC) processors, x86 instruction set compatible processors, multi-core, or any other microprocessor or central processing unit (CPU). In some embodiments, the SIMD processing unit 102 is a component of dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 126 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 126 includes technology to increase the storage performance enhanced protection for valuable digital media when multiple hard drives are included, for example.

The graphics subsystem 514 may perform processing of images such as still or video for display. An analog or digital interface may be used to communicatively couple the graphics subsystem 514 and the display 504. For example, the interface may be any of a High-Definition Multimedia Interface, DisplayPort, wireless HDMI, and/or wireless HD compliant techniques. The graphics subsystem 514 may be integrated into the SIMD processing unit 102 or the chipset 512. Alternatively, the graphics subsystem 514 may be a stand-alone card communicatively coupled to the chipset 512.

The graphics and/or video processing techniques described herein may be implemented in various hardware architectures. For example, graphics and/or video functionality may be integrated within the chipset 512. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 516 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 516 may operate in accordance with one or more applicable standards in any version.

The display 504 may include any television type monitor or display. For example, the display 504 may include a computer display screen, touch screen display, video monitor, television, or the like. The display 504 may be digital and/or analog. In some embodiments, the display 504 is a holographic display. Also, the display 504 may be a transparent surface that may receive a visual projection. Such projections may convey various forms of information, images, objects, or the like. For example, such projections may be a visual overlay for a mobile augmented reality (MAR) application. Under the control of one or more software 128, the platform 502 may display a user interface 518 on the display 504.

The content services device(s) 506 may be hosted by any national, international, or independent service and, thus, may be accessible to the platform 502 via the Internet, for example. The content services device(s) 506 may be coupled to the platform 502 and/or to the display 504. The platform 502 and/or the content services device(s) 506 may be coupled to a network 130 to communicate (e.g., send and/or receive) media information to and from the network 130.

The content delivery device(s) 508 also may be coupled to the platform 502 and/or to the display 504.

The content services device(s) 506 may include a cable television box, personal computer, network, telephone, or Internet-enabled device capable of delivering digital information. In addition, the content services device(s) 506 may include any other similar devices capable of unidirectionally or bidirectionally communicating content between content providers and the platform 502 or the display 504, via the network 130 or directly. It will be appreciated that the content may be communicated unidirectionally and/or bidirectionally to and from any one of the components in the system 500 and a content provider via the network 130. Examples of content may include any media information including, for example, video, music, medical and gaming information, and so forth.

The content services device(s) 506 may receive content such as cable television programming including media information, digital information, or other content. Examples of content providers may include any cable or satellite television or radio or Internet content providers, among others.

In some embodiments, the platform 502 receives control signals from the navigation controller 510, which includes one or more navigation features. The navigation features of the navigation controller 510 may be used to interact with the user interface 518, for example. The navigation controller 510 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 510 may be echoed on the display 504 by movements of a pointer, cursor, focus ring, or other visual indicators displayed on the display 504. For example, under the control of the software, the navigation features located on the navigation controller 510 may be mapped to virtual navigation features displayed on the user interface 518. In some embodiments, the navigation controller 510 may not be a separate component but, rather, may be integrated into the platform 502 and/or the display 504.

The system 500 may include drivers (not shown) that include technology to enable users to instantly turn on and off the platform 502 with the touch of a button after initial boot-up, when enabled, for example. Program logic may allow the platform 502 to stream content to media adaptors or other content services device(s) 506 or content delivery device(s) 508 when the platform is turned "off." In addition, the chipset 512 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 500 may be integrated. For example, the platform 502 and the content services device(s) 506 may be integrated; the platform 502 and the content delivery device(s) 508 may be integrated; or the platform 502, the content services device(s) 506, and the content delivery device(s) 508 may be integrated. In some embodiments, the platform 502 and the display 504 are an integrated unit. The display 504 and the content service device (s) 506 may be integrated, or the display 504 and the content delivery device(s) 508 may be integrated, for example.

The system 500 may be implemented as a wireless system or a wired system. When implemented as a wireless system, the system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 502 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 5.

Figure 6:
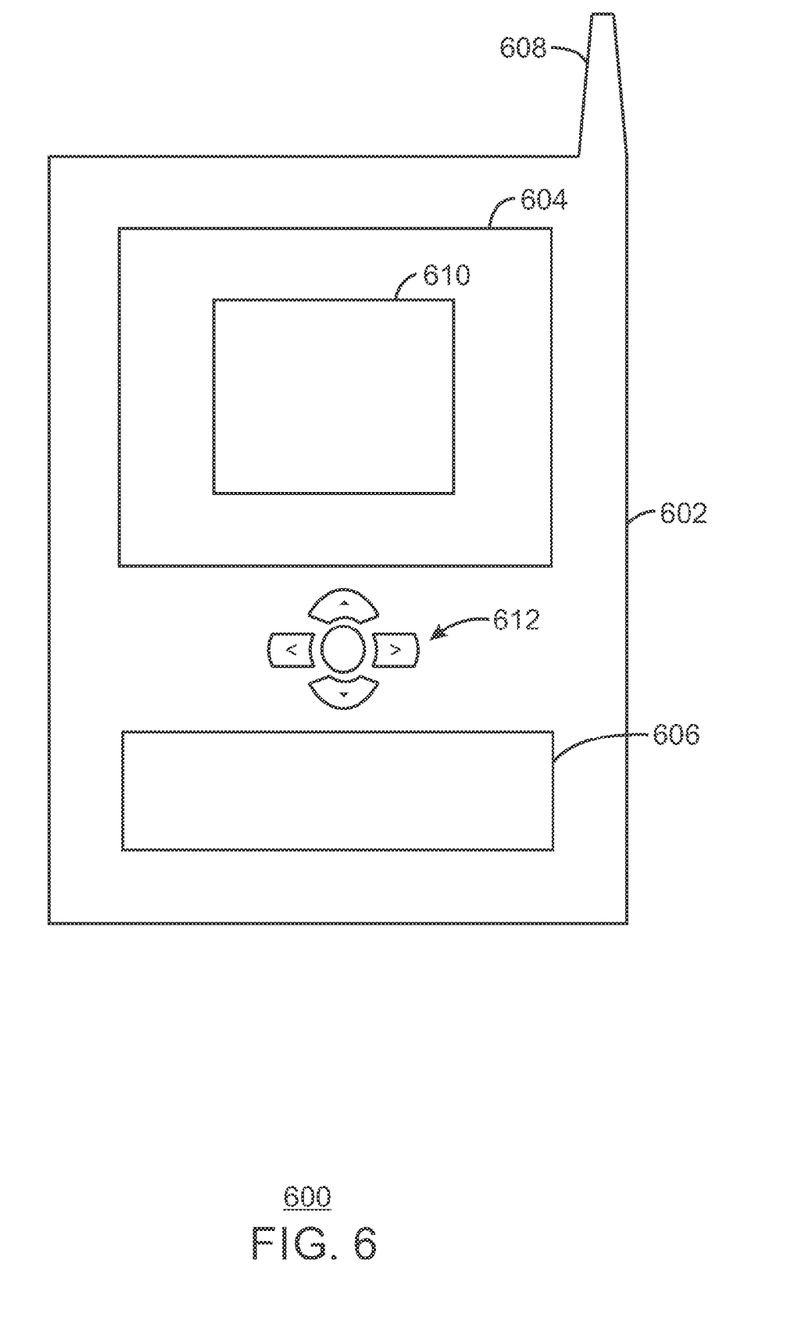
FIG. 6 is a schematic of a small form factor device in which the system of FIG. 5 may be embodied.

FIG. 6 is a schematic of a small form factor device 600 in which the system 500 of FIG. 5 may be embodied. Like numbered items are as described with respect to FIG. 6. In some embodiments, for example, the device 600 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 6, the device 600 may include a housing 602, a display 604, an input/output (I/O) device 606, and an antenna 608. The device 600 may also include navigation features 610. The display 604 may include any suitable display unit for displaying information appropriate for a mobile computing device. The I/O device 606 may include any suitable I/O device for entering information into a mobile computing device. For example, the I/O device 606 may include an alphanumeric keyboard, a numeric keypad, a touch pad, input keys, buttons, switches, rocker switches, microphones, speakers, a voice recognition device and software, or the like. Information may also be entered into the device 600 by way of microphone. Such information may be digitized by a voice recognition device.

Figure 7:
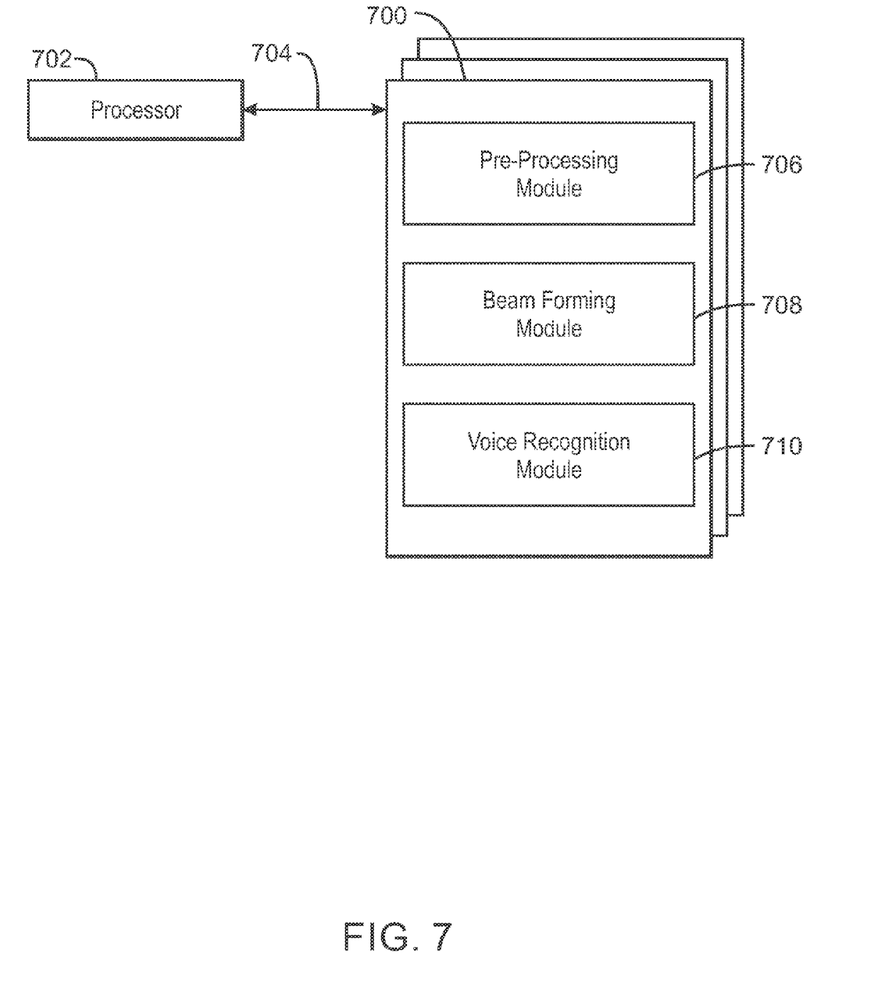
FIG. 7 is a block diagram showing tangible, non-transitory computer-readable media that stores code for data pre-processing and processing for voice recognition.

FIG. 7 is a block diagram showing tangible, non-transitory computer-readable media 700 that stores code for data pre-processing and processing for voice recognition. The tangible, non-transitory computer-readable media 700 may be accessed by a processor 702 over a computer bus 704. Furthermore, the tangible, non-transitory computer-readable media 700 may include code configured to direct the processor 702 to perform the techniques described herein.

The various software components discussed herein may be stored on the tangible, non-transitory computer-readable media 700, as indicated in FIG. 7. For example, a pre-processing module 706 may be configured to pre-process multi-channel raw data. A beam forming module 708 may be configured to perform wide range adaptive beam forming. At block 710, a voice recognition module may be configured to perform full voice recognition.

The block diagram of FIG. 7 is not intended to indicate that the tangible, non-transitory computer-readable media 700 are to include all of the components shown in FIG. 7. Further, the tangible, non-transitory computer-readable media 700 may include any number of additional components not shown in FIG. 7, depending on the details of the specific implementation.

EXAMPLE 1

An apparatus for data pre-processing and processing for voice recognition is described herein. The apparatus includes logic to pre-process multi-channel audio data and logic to resolve a source location. The apparatus also includes logic to perform wide range adaptive beam forming, and logic to perform full voice recognition. Logic to pre-process multi-channel audio data may include an algorithm which separates the multi-channel audio data according to a spatial relationship between the multi-channel audio data. Logic to pre-process multi-channel audio data may include performing light-weight voice recognition to the multi-channel audio data, where the multi-channel audio data is separated according to a spatial relationship between the multi-channel audio data and the light-weight voice recognition specifies an nth channel. Additionally, the nth channel may be used to determine phase relations at a point in time across the multi-channel audio data. A source location may be resolved based on the phase relations. Further, the source location may be indicated by an angle of the nth channel with respect to a number microphones of the apparatus. The wide range adaptive beam forming may adapt to process a voice location based on an angle, a location coordinate, or any combination thereof, found when the source location is resolved.

EXAMPLE 2

A system that performs data pre-processing and processing for voice recognition is described herein. The system includes a display, a radio, and a memory that is to store instructions and that is communicatively coupled to the display. The system also includes a processor communicatively coupled to the radio and the memory, wherein when the processor is to execute the instructions, the processor is to pre-process multi-channel audio data and resolve a source location. Additionally, when the processor is to execute the instructions, the processor is to perform wide range adaptive beam forming, and perform full voice recognition. Pre-processing multi-channel audio data may include an algorithm which separates the multi-channel audio data according to a spatial relationship between the multi-channel audio data. Additionally, pre-processing the multi-channel audio data may include performing light-weight voice recognition to the multi-channel audio data, where the multi-channel audio data is separated according to a spatial relationship between the multi-channel audio data and the light-weight voice recognition specifies an nth channel. The nth channel may be used to determine phase relations at a point in time across the multi-channel audio data. A source location may be resolved based on the phase relations. The source location may be indicated by an angle, a location coordinate, or any combination thereof, of the nth channel with respect to a number microphones of the apparatus. Additionally, the wide range adaptive beam forming may adapt to process a voice location based on an angle, a location coordinate, or any combination thereof, found when the source location is resolved.

EXAMPLE 3

A tangible, non-transitory computer-readable medium for data pre-processing and processing for voice recognition is described herein. The computer-readable medium includes instructions configured to direct a processor to pre-process multi-channel audio data and resolve a source location. The computer-readable medium also includes instructions configured to direct a processor to perform wide range adaptive beam forming, and perform full voice recognition. Pre-processing multi-channel audio data may include an algorithm which separates the multi-channel audio data according to a spatial relationship between the multi-channel audio data. Additionally, pre-processing multi-channel audio data may include performing light-weight voice recognition to the multi-channel audio data, where the multi-channel audio data is separated according to a spatial relationship between the multi-channel audio data and the light-weight voice recognition specifies an nth channel. Further, the nth channel may be used to determine phase relations at a point in time across the multi-channel audio data. A source location may be resolved based on the phase relations, and the wide range adaptive beam forming adapts to process a voice location based on an angle found when the source location is resolved.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for data pre-processing and processing for voice recognition comprising at least partially hardware logic to:
   pre-process multi-channel audio data captured via at least one microphone;
   resolve a source location of a data channel of the multi-channel audio data of a recognized word;
   perform wide range adaptive beam forming on the multi-channel audio using the resolved location; and
   perform full voice recognition on the beam formed audio output, wherein full voice recognition is distinguished from an initial voice recognition used on a small database of recognized words.

2. The apparatus of claim 1, wherein logic to pre-process multi-channel audio data includes an algorithm which separates the multi-channel audio data according to a spatial relationship between the multi-channel audio data.

3. The apparatus of claim 1, wherein logic to pre-process multi-channel audio data includes performing light-weight voice recognition to the multi-channel audio data, where the multi-channel audio data is separated according to a spatial relationship between the multi-channel audio data and the light-weight voice recognition specifies an nth channel.

4. The apparatus of claim 3, wherein the nth channel is used to determine phase relations at a point in time across the multi-channel audio data.

5. The apparatus of claim 4, wherein a source location is resolved based on the phase relations.

6. The apparatus of claim 5, wherein the source location is indicated by an angle of the nth channel with respect to a number microphones of the apparatus.

7. The apparatus of claim 1, wherein the wide range adaptive beam forming adapts to process a voice location based on an angle, a location coordinate, or any combination thereof, found when the source location is resolved.

8. A system that performs data pre-processing and processing for voice recognition, comprising:
   a display;
   a radio;
   a memory that is to store instructions and that is communicatively coupled to the display; and
   a processor communicatively coupled to the radio and the memory,
   wherein when the processor is to execute the instructions, the processor is to:
   pre-process multi-channel audio data captured via at least one microphone;
   resolve a source location of a data channel of the multi-channel audio data of a recognized word of a data channel of the multi-channel audio data of a recognized word;
   perform wide range adaptive beam forming on the multi-channel audio using the resolved location on the multi-channel audio using the resolved location; and
   perform full voice recognition on the beam formed audio output, wherein full voice recognition is distinguished from an initial voice recognition used on a small database of recognized words.

9. The system of claim 8, wherein pre-processing multi-channel audio data includes an algorithm which separates the multi-channel audio data according to a spatial relationship between the multi-channel audio data.

10. The system of claim 8, wherein pre-processing multi-channel audio data includes performing light-weight voice recognition to the multi-channel audio data, where the multi-channel audio data is separated according to a spatial relationship between the multi-channel audio data and the light-weight voice recognition specifies an nth channel.

11. The system of claim 10, wherein the nth channel is used to determine phase relations at a point in time across the multi-channel audio data.

12. The system of claim 11, wherein a source location is resolved based on the phase relations.

13. The system of claim 12, wherein the source location is indicated by an angle, a location coordinate, or any combination thereof, of the nth channel with respect to a number microphones of the apparatus.

14. The system of claim 8, wherein the wide range adaptive beam forming adapts to process a voice location based on an angle, a location coordinate, or any combination thereof, found when the source location is resolved.

15. A tangible, non-transitory computer-readable medium for data pre-processing and processing for voice recognition, comprising instructions configured to direct a processor to:
   pre-process multi-channel audio data captured via at least one microphone;
   resolve a source location of a data channel of the multi-channel audio data of a recognized word;
   perform wide range adaptive beam forming on the multi-channel audio using the resolved location; and
   perform full voice recognition on the beam formed audio output, wherein full voice recognition is distinguished from an initial voice recognition used on a small database of recognized words.

16. The tangible, non-transitory computer-readable medium of claim 15, wherein pre-processing multi-channel audio data includes an algorithm which separates the multi-channel audio data according to a spatial relationship between the multi-channel audio data.

17. The tangible, non-transitory computer-readable medium of claim 15, wherein pre-processing multi-channel audio data includes performing light-weight voice recognition to the multi-channel audio data, where the multi-channel audio data is separated according to a spatial relationship between the multi-channel audio data and the light-weight voice recognition specifies an nth channel.

18. The tangible, non-transitory computer-readable medium of claim 17, wherein the nth channel is used to determine phase relations at a point in time across the multi-channel audio data.

19. The tangible, non-transitory computer-readable medium of claim 18, wherein a source location is resolved based on the phase relations.

20. The tangible, non-transitory computer-readable medium of claim 15, wherein the wide range adaptive beam forming adapts to process a voice location based on an angle found when the source location is resolved.

* * * * *